United States Patent [19]

Ricketts, Jr. et al.

[11] 3,936,071
[45] Feb. 3, 1976

[54] STEERING SYSTEM MONITORING APPARATUS AND PROCEDURE

[75] Inventors: James B. Ricketts, Jr., Warren; William A. Hehs, Birmingham; John T. Auman, Washington; Timothy R. Schlax, Rochester, all of Mich.

[73] Assignee: General Motors Corporation, Detroit, Mich.

[22] Filed: Feb. 10, 1975

[21] Appl. No.: 548,196

[52] U.S. Cl............ 280/95 R; 280/87 R; 340/52 R; 340/282; 180/103 R
[51] Int. Cl............................................. B62d 7/20
[58] Field of Search.............. 180/82 R, 103, 98, 79, 180/79.1; 280/95 R, 94; 340/52 R, 282; 33/203.18, 335

[56] References Cited
UNITED STATES PATENTS

| | | | |
|---|---|---|---|
| 2,672,597 | 3/1954 | Ritch............................ | 340/52 R |
| 3,229,992 | 1/1966 | Trdywick...................... | 180/79.1 X |
| 3,597,728 | 8/1971 | Kurtz............................ | 340/52 R |
| 3,654,599 | 4/1972 | Sepper.......................... | 340/52 R |
| 3,673,561 | 6/1972 | Bronstein...................... | 340/282 |

*Primary Examiner*—Kenneth H. Betts
*Attorney, Agent, or Firm*—Saul Schwartz

[57] ABSTRACT

Procedure and apparatus for monitoring the lash and the toe-in of a vehicle steering system by comparing the angular position of the vehicle's steering wheel as the front wheel spindles pass through preselected reference positions during tuning maneuvers. For example, an angular position transducer at one front wheel determines the instant at which that wheel spindle crosses the reference position in one direction and gates the output of an angular position transducer of the steering wheel to a comparator which stores the signal corresponding to the instantaneous angular position of the steering wheel. When that wheel spindle next crosses the reference position in the opposite direction the instantaneous output of the steering wheel angular position transducer is again gated to the comparator which then compares the two signals and generates a proportional output signal which is transmitted to a display means which functions to display an improper lash condition warning when the comparator output signal achieves a preselected magnitude.

5 Claims, 6 Drawing Figures

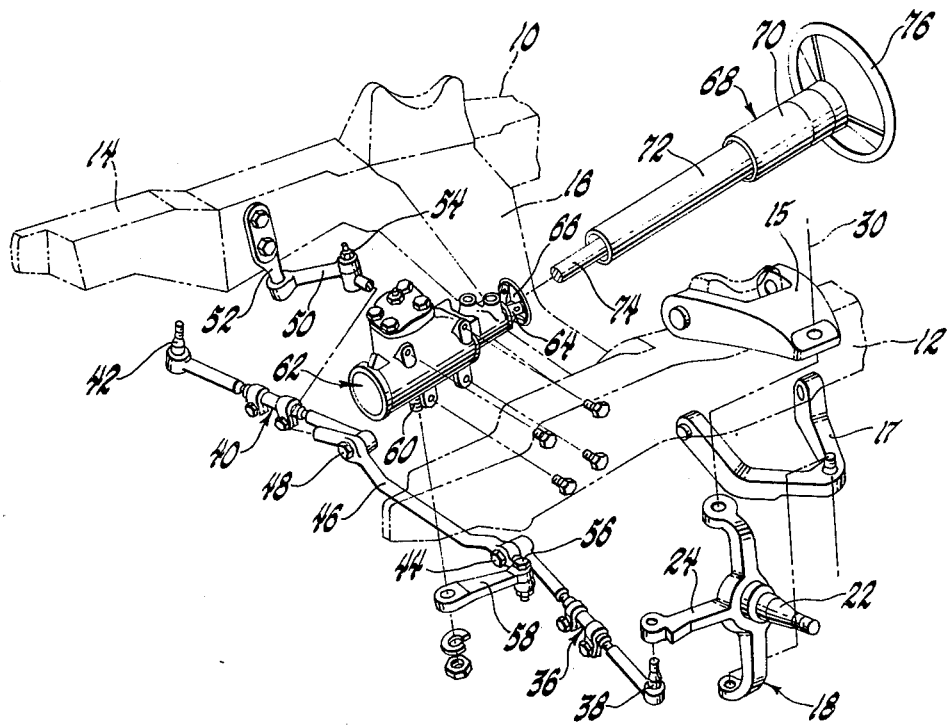

STEERING SYSTEM MONITORING APPARATUS AND PROCEDURE

This invention relates generally to the steering system of an automative vehicle and more particularly to a procedure and apparatus for diagnostically monitoring various characteristics of the system.

A typical automative vehicle steering system includes a pair of steerable road wheels rotatably supported on respective ones of a pair of spindles. Each spindle is part of or attached to a steering knuckle which, in turn, is supported on the vehicle for rotation about a corresponding one of a pair of generally vertical steering axes. Steering linkage is disposed on the vehicle between each of the steering knuckles and a steering gear assembly and a steering column or shaft is connected to the steering gear assembly and rotatable relative to the vehicle. Finally, a steering handwheel is rigidly attached to the steering shaft so that manual torque applied at the handwheel is transferred through the steering shaft to the steering gear assembly wherein it is multiplied and then applied to the steering knuckles through the steering linkage to effect rotation of the knuckles about the steering axes. With respect to such systems, automative engineers use the term "lash" to describe the lost motion or "play" between the handwheel and the steering knuckles which is virtually unavoidable in any practical system. Thus, when the operator applies torque at the handwheel, there is a momentary and substantially imperceptible delay between the instant the handwheel begins turning and the instant the steering knuckles begin pivoting about the steering axes. This delay results from the fact that the lash in the system must be taken up before the steering knuckles begin pivoting. The novel steering system monitoring procedure and apparatus according to this invention function to continuously monitor the magnitude of the lash in the steering system for the purpose of alerting the operator or service technician when an excess lash condition exists.

Another characteristic of the steering system which automative engineers are concerned with is wheel alignment and, in particular, the characteristic referred to as "toe-in". For various, well-known reasons, it has been found advantageous to orient the vehicle's steerable wheels such that when the hand wheel is in a position corresponding to straight ahead travel the axes of the wheel spindles form small acute angles with respect to a transverse axis of the vehicle. Thus, the steerable road wheels are normally toed-in or directed slightly inwardly. The novel steering system monitoring procedure and apparatus according to this invention also function to monitor the toe-in characteristic of the steering system for the purpose of alerting the operator or service technician of an improper toe-in condition.

Accordingly, the primary feature of this invention is that it provides a novel procedure for monitoring related characteristics of a vehicle steering system and novel apparatus for carrying out the procedure. Another feature of this invention is that it provides a novel procedure and novel apparatus for monitoring, in particular, the lash in the steering system and the toe-in condition of the steerable wheels. Yet another feature of this invention is that it provides a novel steering system monitoring procedure wherein a reference position for each wheel spindle is selected, normally the straight-ahead position, and the angle of the steering handwheel is monitored at the instant the spindles pass through the reference position so that by comparing the handwheel angles when the spindles sequentially pass through the reference position in opposite directions the system lash can be determined and by comparing the handwheel angles corresponding to the instance at which the spindles passed through their respective reference positions in the same direction of movement the wheel toe-in condition can be determined. A still further feature of this invention resides in the provision of novel apparatus including a pair of angular position transducers for monitoring each wheel spindle, an angular position transducer for monitoring the instantaneous angular position of the steering handwheel, a comparator connected to the handwheel transducer for comparing the various instantaneous outputs thereof, and electronic gating circuitry for controlling the inputs to the comparator in accordance with the outputs of the spindle transducers. These and other feature of this invention will be readily apparent from the following specification and from the drawings wherein:

FIG. 1 is an exploded perspective view of a typical automobile steering system, the lash and toe-in of which are to be monitored by a procedure and apparatus according to this invention;

FIG. 2 is a schematic plan view of the steering system shown in FIG. 1;

FIG. 3 is a schematic plan view showing a part of the wheel spindle angle monitoring portion of the apparatus according to this invention;

Figure 4:
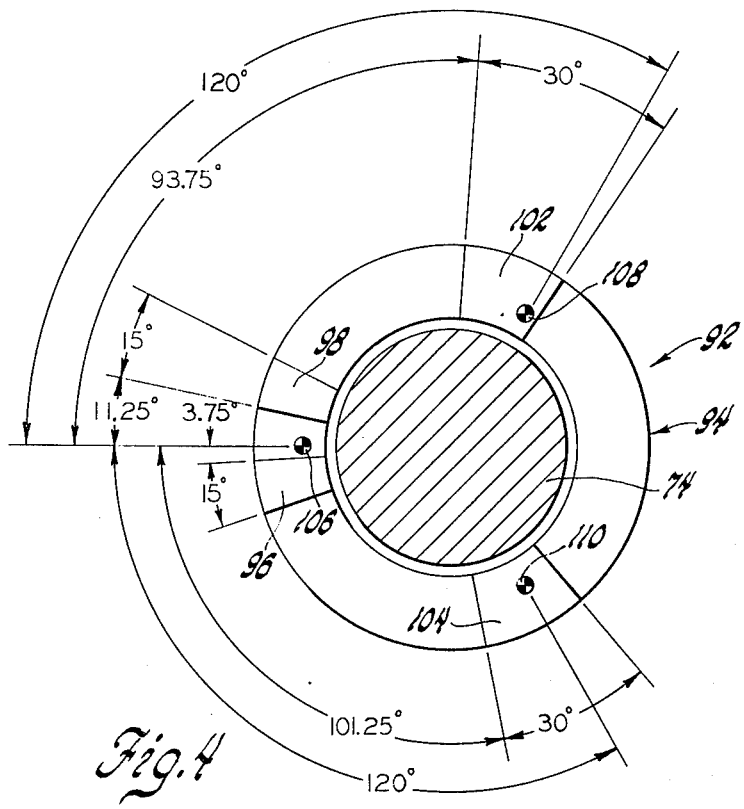
FIG. 4 is a schematic view of a part of the steering wheel angle monitoring portion of the apparatus according to this invention.

Referring now to the drawings, FIG. 1 depicts in exploded perspective fashion a typical automobile steering system which normally is supported on a frame portion 10 of the vehicle. The frame portion includes a left side rail 12 and a right side rail 14 interconnected at the forward end of the vehicle by a cross member 16. Conventional suspension components such as upper and lower A-frame type control arms, 15 and 17 pivotally attached to each of the right and left side rails support respective ones of a pair of steering knuckles 18 and 20, FIGS. 1 and 2, for generally vertical jounce and rebound deflection. The left steering knuckle 18 includes a wheel spindle 22 and a forwardly projecting arm 24. Similarly, the right steering knuckle 20 includes a wheel spindle 26 and a forwardly projecting arm 28. As is conventional, the upper and lower A-frame type control arms are connected to the corresponding one of the steering knuckles 18 and 20 through ball joint or like connections which define a generally vertical left steering axis 30 and a generally vertical right steering axis 32 about which the respective steering knuckles pivot. Each of the wheel spindles 22 and 26 rotatably supports through a conventional wheel bearing arrangement, not shown, one of a pair of steerable road wheels 34, FIG. 2.

Referring again to FIGS. 1 and 2, one end of a left tie rod assembly 36 is pivotally connected to the distal end of projecting arm 24 on the steering knuckle 18 through a ball joint or like connection 38 while one end of a similar, right tie rod assembly 40 is pivotally connected to the distal end of projecting arm 28 by a ball joint or like connection 42. The inboard end of the tie rod assembly 36 is pivotally connected at 44 to a drag link or relay rod 46 and the inboard end of the tie rod assembly 40 is pivotally connected at 48 to the relay rod 46. An idler arm 50 is disposed on a support 52 rigidly attached to the frame rail 14 for pivotal movement about an axis defined by the support. The distal end of the idler arm is pivotally connected to the right end of the relay rod 46 at 54. The left end of the relay rod is pivotally attached at 56 to one end of a pitman arm 58, the other end of the pitman arm being rigidly attached to a pitman shaft 60 projecting from a steering gear assembly 62. The steering gear assembly is rigidly attached to the inboard side of the frame rail 12 and includes an input shaft 64 which carries a flexible connector 66.

The steering system thus described is conventional and functions in well-known manner to transform a rotary input at the input shaft 64 into pivotal movement of the wheels 34 about corresponding ones of the steering axes 30 and 32. More particularly, rotation of the flexible connector 66 effects concurrent rotation of the pitman shaft 60 and attached pitman arm 58. The pivot connection 56 transforms the pivotal motion of the pitman shaft into lateral bodily shiftable motion of the relay rod 46. The motion of the relay rod is transferred directly to the tie rod assemblies 36 and 40 which thus move transversely relative to the frame 10. The pivot joints 38 and 42 at the distal ends of the tie rod assemblies 36 and 40, respectively, function to convert the transverse bodily shiftable movement of the tie rod assemblies into pivotal movement of the corresponding one of the steering knuckles 18 and 20 about the steering axes 30 and 32, respectively.

Referring again to FIGS. 1 and 2, the steering system further includes a steering column assembly designated generally 68 having an upper mast jacket section 70 and a lower mast jacket section 72. The mast jackets are rigidly supported on the body portion of the vehicle, now shown, and cooperate in rotatably supporting therewithin a steering shaft 74, the lower end of which rigidly attaches to the coupling 66 on the input shaft 64. A hand wheel or steering wheel 76 is rigidly attached to the upper end of the steering shaft 74 and is adapted in well-known manner for manual manipulation by an operator seated within the vehicle body. Accordingly, when the steering wheel 76 is manually rotated the steering gear input shaft experiences concurrent rotation and effects, as described hereinbefore, pivotal movement of the wheels 34 about corresponding ones of the steering axes.

In the steering system described, the phenomenon known as "lash" can be observed. Generally speaking, lash is the lost motion within the system which must be taken up before the steering knuckles 18 and 20 begin to pivot in response to rotation of the steering wheel. Such lost motion is the result of a number of causes including, for example, manufacturing tolerances and normal wear between parts. Thus, when lash is present in the system, initial rotation of the steering wheel 76 functions only to take up the lash without effecting concurrent pivotal movement of the steering knuckles. When all the lash in the steering system is completely taken up, the steering knuckles begin to pivot about the steering axes. For purposes of the present discussion, the lash of the entire steering system is defined as the included angle through which the steering wheel 76 is turned before pivotal movement of the steering knuckles is initiated and it is this included angle which is continuously monitored by the procedure and apparatus according to this invention.

Another characteristic of the steering system which is advantageously monitored by the procedure and apparatus according to this invention is "toe-in". Toe-in, for purposes of the present discussion, is defined as the included angles $\theta$, FIG. 2, between a transverse axis 78 of the vehicle extending perpendicular to the longitudinal plane of symmetry of the latter and the axes of the wheel spindles 22 and 26 when the steering wheel 76 is in a predetermined reference position corresponding to straight-ahead movement of the vehicle. Thus, for example, if the wheel spindles project exactly perpendicular to the longitudinal plane of symmetry of the vehicle, when the steering wheel is in the reference position, the toe-in is zero. In actual practice, however, the wheels 34 point slightly toward the center of the vehicle and are, thus, toed in as shown in exaggerated fashion in FIG. 2. Each of the spindles 22 and 26 thus defines an angle $\theta$ with respect to the transverse axis 78 in the reference position of the steering wheel 76.

Referring now to FIGS. 3 and 4, the lash and toe-in characteristics of the steering system are continuously monitored by a pair of angular position transducers disposed at each steering knuckle 18 and 20 and by an angular positioned transducer disposed on the steering column assembly 68. More particularly, as seen best in the schematic representation of FIG. 3, there is associated with each of the steering knuckles identical angular positioned transducers, only right side transducer 80 being shown schematically in FIG. 3 and described hereinafter. The transducer 80 includes a target sector 82 rigidly connected to the steering knuckle 20 and adapted for rotation as a unit with the latter about the steering axis 32. The target sector 82 includes a first arcuate surface 84 disposed at a distance $R_1$ from the steering axis 32 and a second arcuate surface 86 disposed at a distance $R_2$ from the steering axis 32, $R_2$ being greater than $R_1$ and the surfaces 84 and 86 being interconnected by a radially extending shoulder 88..

Referring again to FIG. 3, the angular position transducer 80 further includes a proximity sensor unit 90 rigidly attached to a convenient portion of the vehicle adjacent the target sector 82 so that the target sector is pivotable relative to the sensor during steering maneuvers. The sensor 90 is generally conventional in construction and includes a sensing area 96 disposed on the order of 0.015 and 0.030 inches from the second arcuate surface 86. As described more fully hereinafter, the sensor 90 is adapted to generate an output voltage or signal of given magnitude when the second arcuate surface 86 is located adjacent the sensing area 91 and another, lower output voltage or signal when the first arcuate surface 84 is located adjacent the sensing area. The target sector 82 is oriented on the steering knuckle 20 such that when the spindle 26 is aligned on the transverse axis 78, the radially extending shoulder 88 is aligned with the sensing area so that as the spindle 26 crosses from one side of the transverse axis 78 to the other, the output signal of the sensor 90 changes from the high to the low voltage or vice versa.

As seen best in FIG. 4, a third angular position transducer shown schematically in FIG. 4 and designated generally 92 is disposed on the steering column assembly 68 and functions to monitor the angular position of the steering wheel 76 with respect to the preselected reference position. As noted hereinbefore, the reference position is assumed to be that position of the steering wheel 76 corresponding to exact straight ahead movement of the vehicle. The reference position is shown schematically in FIG. 2. The third transducer 92 includes an annular code ring 94 having four raised segments 96, 98, 102, 104 with the angular relationships shown in FIG. 4. The code ring surrounds the steering shaft 74 and is rigidly attached to the latter for rotation as a unit therewith within the upper mast jacket 70. The third transducer 92 further includes three proximity sensors similar to the sensor 90 described hereinbefore. For purposes of discussion and referring to FIG. 4, the three sensors are identified schematically as point locations 106, 108 and 110. In practice, the sensors are rigidly attached to the steering column assembly; for example, within the upper mast jacket 70, at 120° angular intervals relative to each other. The sensors are intended to detect the presence of the raised segments 96, 98, 102 and 104 adjacent or in proximity to the location designated by the points 106, 108 and 110. Accordingly, the sensors 106, 108 and 110 are supported on the steering column assembly in a plane parallel to the plane of the code ring 94 and each generates or transmits a characteristic constant low or high output voltage or signal corresponding to whether or not one of the raised segments 96, 98, 102 or 104 is disposed adjacent one of the locations designated 106, 108 and 110. The high output voltage corresponds to the presence of a raised segment while the low output voltage corresponds to the absence of a raised segment.

The code ring 94 is, of course, rotatable relative to the three proximity sensors 106, 108 and 110. When the steering shaft and attached code ring are in the positions corresponding to the aforementioned reference position of the steering wheel, the raised segments 96, 98, 102 and 104 assume predetermined angular relationships relative to the three sensors 106, 108 and 110 as shown in FIG. 4. The significance of these angular relationships will become apparent hereinafter.

Figure 5:
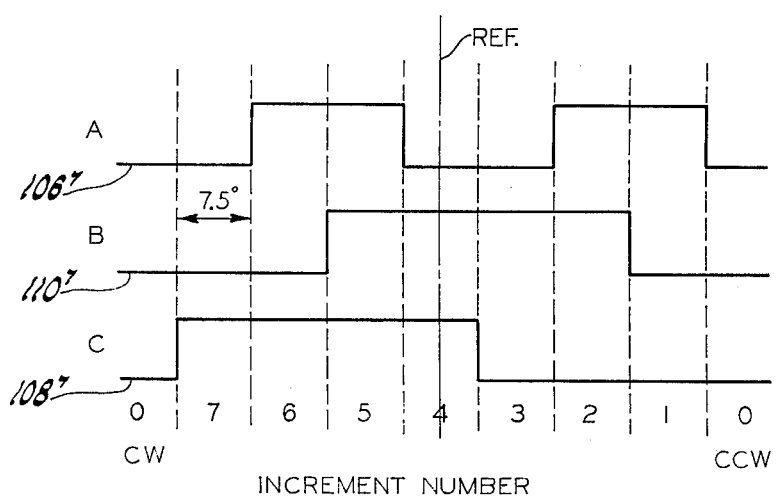
FIG. 5 is a diagram depicting the electrical output signals generated by the steering wheel angle monitoring portion of the apparatus according to this invention.

Referring particularly to FIG. 5 now, the three curves labeled 106', 108' and 110' represent a plot of the output voltage signal of each of the sensors 106, 108 and 110, respectively, as a function of the angular position of the steering wheel 76. The vertical line designated "REF" represents the preselected reference position of the steering wheel 76 corresponding to straight-ahead driving while each of the broken vertical lines represents a 7.5° angular increment, the increments being numbered 1 through 7. The first increment begins at 26.25° on the counterclockwise side of the reference position while the seventh increment ends at 26.25° on the opposite or clockwise side of the reference position. The area designated "0" represents all other angular positions of the steering wheel 76. It will be seen in FIG. 5 that the output voltage signal of only one of the three sensors 106, 108 and 110 changes as the steering wheel passes from one 7.5° increment to another so that for each angular increment there is only one combination of output voltage signals from the three proximity sensors 106, 108 and 110.

Referring to FIGS. 4 and 5, it will be observed that when the steering wheel is in the reference position, FIG. 4, the sensors 108 and 110 generate high voltage output signals while sensor 106 generates a low voltage output signal. This particular combination of output signals remains constant as long as the steering wheel remains within 3.75° of the reference position in either the clockwise or counterclockwise direction, or, in other words, in the fourth increment. If the steering wheel, and hence the code ring 94, are rotated clockwise, FIG. 4, from the reference position through an included angle of between 3.75° and 11.25° then the voltage output signal of the sensor 106 changes from the low level to the high level while the output signals of the sensors 108 and 110 remain unchanged at the high level. Accordingly, whenever all three sensors are generating high voltage output signals, the steering wheel is in the fifth increment. This same analysis, of course, holds true for each of the other increments and it will be apparent to one skilled in the art, from analysis of the angular relationships of FIG. 4, that for every angular position of the steering wheel 76 there is only one particular combination of sensor output signals.

Figure 6:
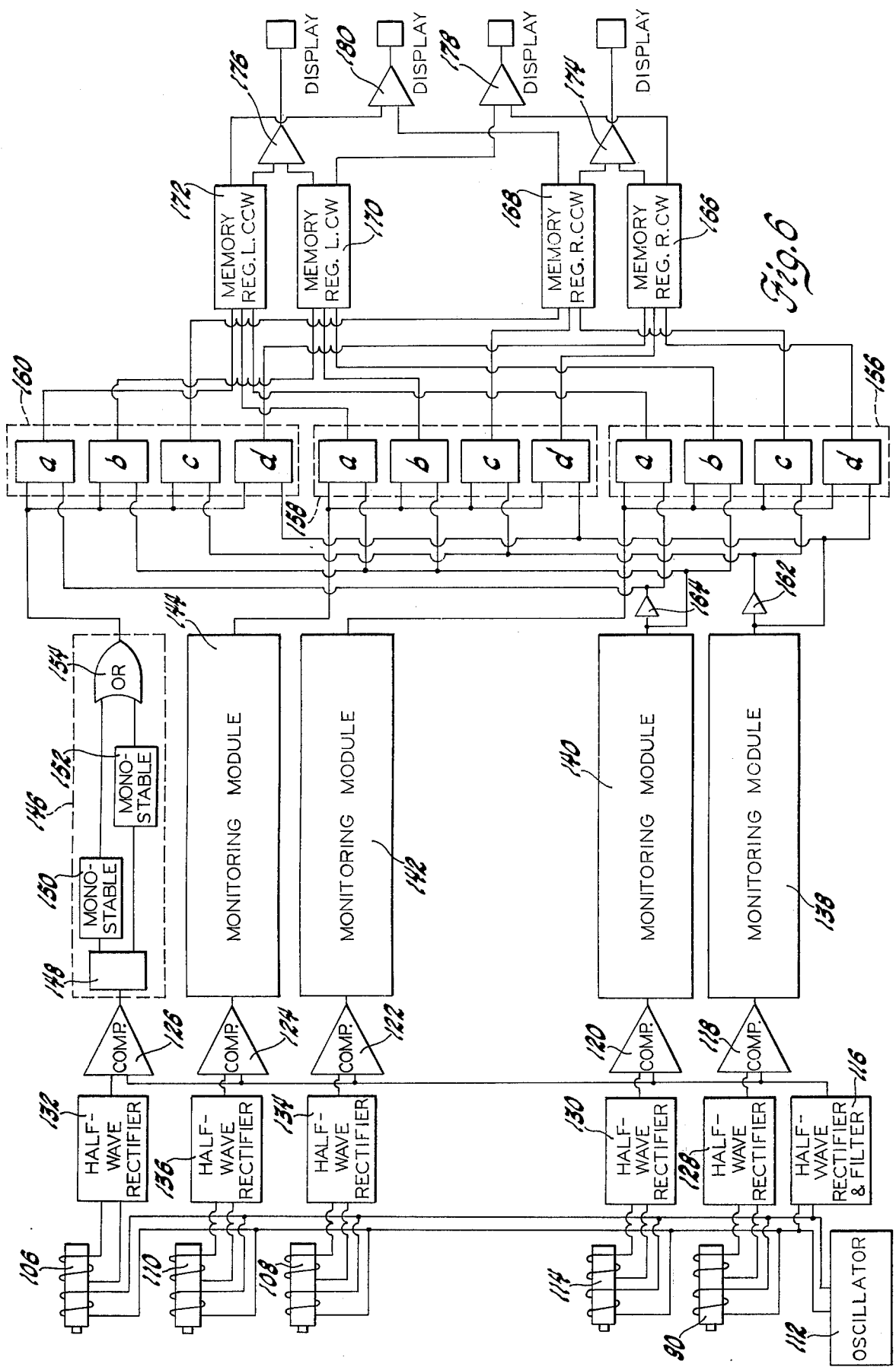
FIG. 6 is a schematic diagram showing the electrical circuit portion of the apparatus according to this invention.

Referring to FIG. 6 and describing the electronic circuit portion of the monitoring apparatus, the angular position transducers at each steering knuckle and the angular position transducer on the steering column assembly are integrated into an electronic circuit including a processing logic, the function of which will become apparent hereinafter. More particularly, an oscillator 112 supplies AC voltage to the proximity sensor 90 at the right steering knuckle 20 and to an identical proximity sensor 114 at the left steering knuckle 18 and also to each of the proximity sensors 106, 108 and 110 on the steering column assembly. In addition, the output of the oscillator 112 is fed through a half-wave rectifier and filter 116 to a plurality of comparators 118, 120, 122, 124 and 126, the rectified voltage applied to the comparators being a reference voltage. The output signal of the proximity sensor 90, being an AC voltage, is fed through a half-wave rectifier 128 to the comparator 118. Similarly, the AC output voltage signals of the proximity sensor 114 and the proximity sensors 106, 108 and 110 are fed, respectively, through a plurality of half-wave rectifiers 130, 132 134, 136 to corresponding ones of the comparators 120, 126, 122 and 124. The comparators function to compare the output signal of the corresponding one of the proximity sensors with the reference signal supplied by the oscillator 112 by determining the difference between the two. In effect, when the output signal of any one of the proximity sensors is at its low level, substantially no output signal is transmitted by the corresponding comparator. Conversely, when a proximity sensor output signal is at its high level, the corresponding comparator transmits a similar, high output signal. The output of each of the comparators 118, 120, 122, 124 and 126 is fed to a corresponding number of identical, signal monitoring modules designated 138, 140, 142, 144 and 146. Describing in detail only the module 146, the latter includes a toggle flip-flop 148, a pair of monostables 150 and 152, and an OR gate 154. When the output signal of the comparator 126 is low, the toggle flip-flop 148 is not energized. When the comparator 126 output signal is high, however, the toggle flip-flop 148 is triggered and the latter then generates two exactly opposite square wave output voltages which are fed to the monostables 150 and 152. The monostables are connected to the OR gate 154 and have different time constants so that a substantially constant voltage is always applied at the OR gate by one or the other of the monostables whenever the toggle flip-flop 148 is energized. The OR gate 154, of course, produces a predetermined output signal whenever it is energized by one or the other of the monostables 150 and 152 and this output signal is the output signal of the monitoring module 146.

Referring again to FIG. 6, each of the monitoring modules 142, 144 and 146 has associated therewith a set of D-type flip-flops designated generally 156, 158 and 160, respectively. Within each set there are four individual D-type flip-flops which will be identified by the numeral designating the set followed by either a, b, c or d. Each D-type flip-flop has a pair of input terminals and a single output terminal. The output voltage of the monitoring module 142 is applied to one input terminal of each of the D-type flip-flops 156 a, b, c, and d in the set 156. Similarly, the output voltages of the monitoring modules 144 and 146 are applied, respectively, to the input terminals of each D-type flip-flop in the sets 158 and 160. The D-type flip-flops function as gates which block further passage of the applied voltage signal unless externally triggered.

The output voltage of the monitoring module 138 associated with the proximity sensor 90 is applied directly to the available input terminal on each of the D-type flip-flops 156d, 158d and 160d in the sets 156, 158 and 160, respectively. The output voltage of the monitoring module 138 is also fed through an inverter 162 and then to the available input terminal on each of the D-type flip-flops 156c, 158c and 160c in the sets 156, 158 and 160, respectively. Similarly, the output voltage of the monitoring module 140 associated with the proximity sensor 114 is fed directly to the D-type flip-flops 156b, 158b and 160b in the sets 156, 158 and 160, respectively, and through an inverter 164 to the D-type flip-flops 156a, 158a and 160a in the sets 156, 158 and 160, respectively.

The D-type flip-flops shown in the preferred embodiment are all identical and are energized or triggered by an increase in voltage applied at their respective input terminals. The proximity sensors at the steering knuckles, of course, generage alternate increases and decreases in output voltage as the wheel spindles 22 and 26 pass back and forth across the transverse axis 78 which increases and decreases are reflected by corresponding increases and decreases in voltage at the outputs of the monitoring modules 140 and 138, respectively. Since the D-type flip-flops are energized or triggered only by increases in voltage, an increase in the output voltage of the modules 138 and 140 directly energizes D-type flip-flops 156d, 158d and 160d and 156b, 158b and 160b, respectively. Conversely, when the output voltage of either of the monitoring modules 138 and 140 decreases, that decrease is inverted by the inverters 162 and 164, respectively, and then applied to the D-type flip-flops 156c, 158c and 160c and 156a, 158a and 160a which are thereby energized or triggered. Accordingly, it will be readily appreciated that each time the spindles 22 and 26 cross the transverse axis 78, regardless of direction, one D-type flip-flop in each of the sets 156, 158 and 160 is triggered.

Referring to FIGS. 3 and 6 the D-type flip-flops 156d, 158d and 160d are each triggered when the right spindle 26 crosses the transverse axis 78 in a clockwise direction, FIG. 3. The output of each of the D-type flip-flops 156d, 158d and 160d is fed to a memory register 166 operative to store the corresponding signal from each of the proximity sensors 106, 108 and 110 as transmitted through the modules 146, 142 and 144 and gated by the D-type flip-flops. Similarly, the D-type flip-flops 156c, 158c and 160c are each triggered when the right spindle 26 crosses the transverse axis in a counterclockwise direction. The output of each of the D-type flip-flops 156c, 158c, and 160c is fed to a second memory register 168, also operative to store the corresponding signal from each of the proximity sensors 106, 108 and 110.

With respect to the left spindle 22, the D-type flip-flops 156b, 158b and 160b and 156a, 158a and 160a are triggered, respectively, when the left spindle crosses the transverse axis 78 in the clockwise direction and in the counter-clockwise direction. The output of the D-type flip-flops 156b, 158b and 160b is fed to a third memory register 170 and the output of the D-type flip-flops 156a, 158a and 160a is fed to a fourth memory register 172. The memory registers 170 and 172 are, of course, also operative to store the output signals of the proximity sensors 106, 108 and 110 as the signals are transferred by the monitoring modules 142, 144 and 146 and gated by the D-type flip-flop sets 156, 158 and 160.

Finally, a first lash comparator 174 is connected to each of the memory registers 166 and 168. A second lash comparator 176 is connected to each of the memory registers 170 and 172. A first toe-in comparator 178 is connected to each of the memory registers 166 and 170. A second toe-in comparator 180 is connected to each of the memory registers 168 and 182. Each of the comparators 174, 176, 178 and 180 is operative to compare the last encoded and memorized signals in the corresponding memory registers and to energize an appropriate display if the comparison exceeds a preselected limit.

It will be apparent from the foregoing description that during vehicle operation the proximity sensors 106, 108 and 110 continuously monitors the angular position of the steering wheel 76 in terms of the eight possible incremental positions shown in FIG. 5. It will be further apparent that the function of the signal monitoring modules 142, 144 and 146 and the D-type flip-flop sets 156, 158 and 160 is to amplify and channel the output signals of the proximity sensors 106, 108 and 110 to an appropriate one of the memory registers 166, 168, 170 and 172, the sole function of the memory registers being to store the signals so that appropriate comparisons can be made by the comparators 174, 176, 178 and 180.

Before describing the monitoring procedure according to this invention it is first necessary to describe in somewhat more detail the lash phenomena. When the steering wheel 76 is rotated in the direction corresponding to a left turn, all the lash is taken up before the wheel spindles begin to pivot in the corresponding direction. When the left turn maneuver is completed a restoring torque on each steering knuckle functions to return the knuckles to a straight-ahead position, even in the absence of manual effort at the steering wheel, the restoring torque being the result, primarily of the caster angles of the steering axes. The lash in the system, of course, does not reappear until the restoring torque on the steering knuckles disappears which, theoretically, occurs when the wheels are once again oriented in a straight-ahead direction.

In practice, however, the instant at which the restoring torque disappears varies continuously as a result of several factors including the amount of crown on the road being traversed. Accordingly, in left turn situations, there will be occasions when the system lash is completely taken up before the left wheel spindle crosses 22 the transverse axis 78 in the counter-clockwise, FIG. 2, or left turn direction and does not reappear until after the left wheel spindle recrosses the transverse axis 78 in the opposite direction. In this situation, the angle of the steering wheel relative to the reference position at both instants in time when the left wheel spindle crossed the transverse axis in opposite directions is unchanged, thus indicating a zero lash condition. There will also be occasions when the restoring torque disappears and the lash reappears before the left wheel spindle recrosses the transverse axis in the clockwise direction. In this situation, during the next succeeding right turn maneuver when the system lash is taken up in the opposite direction, the angle of the steering wheel relative to the reference position at the instant the left wheel spindle recrosses the transverse axis 78 in the clockwise, FIG. 2, or right turn direction is different from the angle at the instant of the preceding crossing in the left turn direction. The difference between these two steering wheel angles is a measure of the total lash in the steering system. It will, of course, be apparent that this same analysis applies for the right wheel spindle 26.

Referring particularly to FIG. 6 and describing the procedure according to this invention for monitoring total lash in the steering system during, for example, a left turn maneuver, the proximity sensors 106, 108 and 110 provide continuous output signals to the D-type flip-flop sets through corresponding ones of the monitoring modules 146, 142 and 144. The D-type flip-flops prevent transmission of the signals until triggered by the proximity sensors 90 and 114. In the example left turn situation, when the left spindle 22 crosses the transverse axis 78 moving in the left turn or counter-clockwise direction, FIG. 2, the proximity sensor 114 adjacent the left steering knuckle 18 energizes or triggers D-type flip-flops 156b, 158b and 160b which thereupon pass the instantaneous output signals of the proximity sensors 108, 110 and 106, respectively, to the memory register 170 where the signals are stored. The stored signals, of course, represent the instantaneous angular position of the steering wheel in terms of the seven increments shown in FIG. 5 when the left spindle crossed the transverse axis 78.

When the left spindle 22 next crosses the transverse axis 78 in the opposite or clockwise direction, FIG. 2, the proximity sensor 114 triggers or energizes the D-type flip-flops 156a, 158a and 160a through the inverter 164. The flip-flops 156a, 158a and 160a thereupon pass the instantaneous output signals of the proximity sensors 108, 110 and 106, respectively, to the memory register 172 where the signals are stored. The signals thus stored in the memory register 172 represent the angular position of the steering wheel at the instant the left wheel spindle 22 next crossed the transverse axis 78 in the clockwise or right turn direction. The comparator 176 then compares the two stored angular representations, and, if a preselected angle is exceeded, energizes a display indicating the presence of excess lash in the system. While only the left spindle measurement has been described, it will be apparent that the same analysis holds true for the right spindle.

With respect to monitoring of the toe-in condition of the system, it will be apparent to those skilled in the art from the foregoing description that this condition also can be determined in terms of steering wheel angle. More particularly, if we assume no lash in the system and zero toe-in conditions, then in the reference position of the steering wheel 76, both spindles 22 and 26 would be aligned on the transverse axis 78. Similarly, as the wheels 34 pivot back and forth across the straight-ahead positions, as during turning maneuver, the spindles 22 and 26 would always cross the axis 78 at the same instant since no lash is present in the assumed system. Therefore, if the steering wheel angles were noted and compared at the instant each of the spindles crossed the transverse axis 78, while pivoting in the same direction, as would occur, for example, when a right turn is executed immediately after a left turn, there would be no difference. If a positive difference did exist it would indicate the existence of an improper toe-in condition in the system since the latter was assumed to have zero toe-in.

In actual practice, of course, lash does exist in all steering systems. However, a lash-free system is approximated in a situation where the operater turns the steering wheel to manually take up the lash before the wheels 34 cross the straight-ahead position. This situation would occur, for example, if the operator begins turning the wheel to effect a right turn while the wheels 34 are still directed in a left-turn direction. Thus, it is only necessary to determine the angle of the steering wheel 76 at the instant spindle 22 crosses the axis 78 and at the instant spindle 26 crosses the axis 78. These two angles will have a predetermined maximum difference which depends upon the permissible toe-in of the wheels and if the difference exceeds the maximum, an improper toe-in condition exists.

Referring to FIGS. 2 and 6 and assuming a positive sweep of the wheels 34 from a full left turn position to a full right turn position, to remove or take up all lash, the right spindle 26 will normally cross the transverse axis 78 in the clockwise direction first. At this instant, the proximity sensor 90 triggers or energizes the D-type flip-flops 156d, 158d and 160d which thereupon pass the instantaneous output signals of the proximity sensors 108, 110 and 106, respectively, to the memory register 166 where the signals are stored. These stored signals represent the instantaneous angular position of the steering wheel 76 at the instant right spindle 26 crossed the transverse axis 78.

As the positive sweep from left to right continues, the left spindle 22 crosses the transverse axis 78. At the instant of crossing the proximity sensor 114 energizes or triggers the D-type flip-flops 156b, 158b and 160b, respectively. These D-type flip-flops then pass or gate the instantaneous output signals of the proximity sensors 108, 110 and 106 to the memory register 170 where they are stored. The signals thus stored represent the instantaneous angular position of the steering wheel 76 at the instant the left spindle 22 crossed the transverse axis 78.

The signals thus stored in the memory registers 166 and 170 are compared by the toe-in comparator 178 and if a predetermined difference is exceeded, the comparator energizes a display indicating excess or improper toe-in. While toe-in measurement in a left to right sweep has been described, it will be apparent that the same analysis holds true for toe-in measurement in a right to left sweep.

Having thus described the invention, what is claimed is:

1. A procedure for monitoring lash in the steering system of a vehicle, said steering system including a wheel spindle supported on the vehicle for pivotal movement in two opposite directions about a steering axis of said vehicle, a steering handwheel rotatably supported on said vehicle for manual manipulation, and gear and linkage means disposed between said spindle and said handwheel for effecting pivotal movement of said spindle in response to rotation of said handwheel, comprising the steps of continuously monitoring the angular position of said handwheel with an angular position transducer operative to generate an electrical signal corresponding to the instantaneous angular position of said handwheel, detecting the passage of said spindle through a preselected reference position in one of said two opposite directions of movement, electrically gating the output of said angular position transducer at the instant said spindle passes through said reference position to a comparator operative to determine the difference between two electrical input signals and to generate an output signal proportional to the difference between the two input signals, detecting the next sequential passage of said spindle through said reference position in the other said two opposite directions, electrically gating the output of said angular position transducer at the instant said spindle next sequentially passes through said reference position in said other direction to said comparator, said comparator generating an output signal proportional to the difference between said two sequentially gated signals from said angular position transducer, and conducting said comparator output signal to a display means for warning of improper lash condition when said comparator output signal achieves a preselected magnitude.

2. A procedure for monitoring the toe-in condition of the steering system of a vehicle, said steering system including a pair of wheel spindles supported on said vehicle for pivotal movement in two opposite directions about respective ones of a pair of steering axes of said vehicle, a steering handwheel rotatably supported on said vehicle for manual manipulation, and steering gear and linkage means disposed between said handwheel and each of said spindles for effecting pivotal movement of the latter in response to rotation of the former, comprising the steps of, continuously monitoring the angular position of said handwheel with an angular position transducer operative to generate an electrical signal corresponding to the instantaneous angular position of said handwheel, detecting the passage of one of said two spindles through a preselected reference position in one of said two opposite directions, electrically gating the output of said angular position transducer at the instant said one spindle passes through said reference position in said one direction to a comparator operative to determine the difference between electrical input signals and to generate an output signal proportional to the difference between the two input signals, detecting the passage of the other of said two spindles through a corresponding preselected reference position in said one direction, electrically gating the output of said angular position transducer at the instant said other spindle passes through said corresponding reference position in said one direction to said comparator, said comparator generating an output signal proportional to the difference between the two gated input signals from said angular position transducer, and conducting said comparator output signal to a display means for warning of improper toe-in condition when said comparator output signal achieves a preselected magnitude.

3. In combination with the steering system of a vehicle, said steering system including a wheel spindle supported on said vehicle for pivotal movement in two opposite directions about a steering axis of said vehicle, a steering handwheel rotatably supported on said vehicle for manual manipulation, and steering gear and linkage means disposed between said spindle and said handwheel for effecting pivotal movement of said spindle about said steering axis in response to rotation of said handwheel, apparatus for monitoring the lash condition of said steering system comprising, a first angular position transducer disposed between said vehicle and said spindle for detecting passage of said spindle through a preselected reference position in each of said two opposite directions, electronic circuit means associated with said first transducer for generating a pair of output signals corresponding to passage of said spindle through said reference position in each of said two opposite directions, a second angular position transducer disposed between said vehicle and said handwheel operative to generate an electrical output signal corresponding to the instantaneous angular position of said handwheel, comparator means operative to compare a pair of electrical input signals and generate an output signal proportional to the magnitude of the difference between said input signals, electrical gating means between said comparator means and said second angular position transducer responsive to said pair of output signals of said first angular position transducer for sequentially gating the instantaneous output signal of said second angular position transducer to said comparator means as said spindle passes through said reference position in each of said two opposite directions, said comparator means generating an electrical output signal proportional to the difference between said two gated input signals, display means associated with said comparator and operative to warn of an improper lash condition when said comparator output signal achieves a preselected magnitude.

4. In combination with the steering system of a vehicle, said steering system including a pair of wheel spindles disposed on said vehicle for pivotal movement about respective ones of a pair of steering axes of said vehicle, in two opposite directions, a steering handwheel rotatably supported on said vehicle for manual manipulation, and steering gear and linkage means disposed between said handwheel and each of said spindles for effecting concurrent pivotal movement of said spindles about said steering axes in response to rotation of said handwheel, apparatus for monitoring the toe-in condition of said steering system comprising, a first angular position transducer disposed between said vehicle and one of said spindles, a second angular position transducer disposed between said vehicle and the other said spindles, each of said first and said second angular position transducers being operative to generate an electrical output signal corresponding to passage of each of said first and said second spindles through respective ones of a pair of preselected reference positions in the same one of said two opposite directions, a third angular position transducer disposed between said vehicle and said handwheel operative to generate an electrical output signal corresponding to the instantaneous angular position of said handwheel, a comparator operative to compare a pair of electrical input signals and generate an output signal proportional to the magnitude of the difference between the input signals, gating means disposed between said comparator and said third transducer responsive to said output signals of each of said first and said second transducers for sequentially gating the instantaneous output of said third transducer to said comparator means as each of said first and said second spindles passes through the corresponding one of said reference positions in the same direction of movement, said comparator means generating an electrical output signal proportional to the difference between said two gated input signals, and display means associated with said comparator means and operative to warn of an improper toe-in condition when said comparator output signal achieves a preselected magnitude.

5. In combination with the steering system of a vehicle, said steering system including a pair of wheel spindles disposed on said vehicle for pivotal movement about respective ones of a pair of steering axes of said vehicle in two opposite directions, a steering handwheel rotatably supported on said vehicle for manual manipulation, and steering gear and linkage means disposed between said handwheel and each of said spindles for effecting concurrent pivotal movement of said spindles about said steering axes in response to rotation of said handwheel, apparatus for monitoring the condition of said steering system comprising, a first angular position transducer disposed between said vehicle and one of said spindles, a second angular position transducer disposed between said vehicle and the other of said spindles, each of said first and said second angular position transducers being operative to generate a pair of electrical output signals corresponding to passage of each of said first and said second spindles through respective ones of a pair of preselected reference positions in each of said two opposite directions, a third angular position transducer disposed between said vehicle and said handwheel operative to generate an electrical output signal corresponding to the instantaneous angular position of said handwheel, a first comparator means, a second comparator means, each of said first and said second comparator means being operative to compare a pair of electrical input signals and to generate an output signal proportional to the magnitude of the difference between the input signals, first electrical gating means disposed between said first comparator and said third transducer and responsive to one of said two output signals of each of said first and said second transducer for sequentially gating the instantaneous output of said third transducer to said comparator means as each of said first and said second spindles passes through the corresponding one of said reference positions in the same direction of movement, said first comparator means generating an electrical output signal proportional to the difference between said two gated input signals, first display means associated with said first comparator means and operative to warn of an improper toe-in condition when said first comparator output signal achieves a preselected magnitude, second electrical gating means between said third transducer and said second comparator means being responsive to said output signals of each of said first and said second transducers for instantaneously gating the output signal of said third transducer to said second comparator as each of said first and second spindles passes through the corresponding one of said reference positions in the same one of said two opposite direction, said second comparator means being operative to generate an output signal proportional to the differences between the gated input signals, and a second display means associated with said second comparator means and operative to warn of an improper lash condition when said second comparator output signal achieves a preselected magnitude.

\* \* \* \* \*